FREQUENCY CONTROL SYSTEM

Filed Dec. 11, 1953 3 Sheets-Sheet 1

INVENTOR.
Harris A. Robinson
BY F. A. Rechif
AGENT

INVENTOR.
Harris A. Robinson
BY G. A. Reckif
AGENT

FREQUENCY CONTROL SYSTEM

Filed Dec. 11, 1953 3 Sheets-Sheet 3

INVENTOR.
Harris A. Robinson
BY [signature]
AGENT

United States Patent Office 2,777,064

Patented Jan. 8, 1957

2,777,064

FREQUENCY CONTROL SYSTEM

Harris A. Robinson, Palmyra, N. J., assignor, by mesne assignments, to the United States of America as represented by the Secretary of the Air Force Application December 11, 1953, Serial No. 397,572

12 Claims. (Cl. 250—36)

This invention relates to a frequency control system, and more particularly to a control system for a multichannel controlled or captive oscillator.

In my copending application, Serial No. 257,148, filed November 19, 1951, there is disclosed a multi-channel (44,000-channel) frequency generator and frequency control system for a master (captive) oscillator which is used as a heterodyne oscillator in a communications transmitter-receiver. The frequency generator disclosed in such application operates to permit the selection of any one of 44,000 possible communication channels and to thereafter automatically tune the master oscillator to a frequency such that communication may be carried on in the desired, selected channel.

In the referenced frequency control system, between successive automatic tuning cycles or during normal operation of the transmitter-receiver for communications purposes the frequency of the master oscillator is stabilized or controlled by means of a phase discriminator-reactance tube combination (the reactance tube, incidentally, being used also during a portion of the automatic tuning cycle), a voltage wave representative of the master oscillator output frequency being compared in the phase discriminator with a voltage wave of stable reference frequency and the output of the phase discriminator being applied to the reactance tube associated with the master oscillator. With this type of frequency control or stabilization means, there is normally a rather extended "hold-in range" over which the master oscillator, once locked in to the desired frequency selected by the channel selecting means, will hold in under frequency control by the phase discriminator-reactance tube combination. However, this "hold-in range" is effective only for relatively slow frequency variations or drifts of the master oscillator, those due to the effects of temperature, humidity or voltage variations, aging of tubes, etc. There is a much more limited "lock-in range" contained within the "hold-in range," this "lock-in range" being characterized by the ability of the frequency generator and control system to initially (i. e., during an automatic tuning cycle) lock in the frequency of the captive master oscillator, or to regain frequency control of the master oscillator after a transient disturbance (e. g., arising from mechanical shock or from a voltage surge). Such transient disturbances are very likely to occur in aircraft, for which the referenced transmitter-receiver, including the frequency generator and control system, is particularly adapted. When a frequency generator system of the type disclosed in my aforesaid copending application is to be subjected to such transient disturbances, the reliability of the system is directly proportional to the extent of the "lock-in range." The present invention is an improvement over the system of my copending application.

An object of this invention is to devise a phase discriminator-reactance tube type of frequency control system wherein the "lock-in range" is enlarged many fold as compared to systems of the prior art.

Another object is to provide a multi-channel frequency generator for a master controlled or captive oscillator, in which the master oscillator is automatically relocked to the proper frequency or phase after it has been forced out of lock as a result of a severe disturbance, electrical or mechanical.

A further object is to devise a frequency generator and control system for a controlled oscillator, in which the controlled oscillator is automatically relocked to the proper frequency after it has fallen out of lock as the result of a transient disturbance, in such situations where the controlled oscillator is outside the normal "lock-in range" of the frequency control system after the disturbance has ceased to exist.

The objects of this invention are accomplished, briefly, in one exemplification of the invention in the following manner: the frequency generator or frequency control system for the master oscillator of a transmitter-receiver includes a plurality of cascaded mixers in the first of which the master (captive) oscillator frequency is mixed with a selected crystal-stabilized frequency and in the subsequent ones of which the various resulting beat frequencies are mixed with respective selected crystal-stabilized frequencies. Following the final mixer, in which a fixed beat frequency (e. g., 500 kc.) is produced, a regenerative-type frequency divider is used to divide this frequency down to 50 kc. to provide one input to a phase discriminator. Any interruption or loss of normal frequency control (i. e., breaking out of lock) of the captive oscillator results in a marked change in the grid voltage of a tube in this divider, and in one embodiment this change is utilized, as a bias voltage, to gate on an auxiliary low frequency oscillator which modulates or sweeps the frequency of the master oscillator by means of the reactance tube used for normal frequency control. During such sweep, the master oscillator will lock in again. In the preferred specific embodiment, no auxiliary low frequency oscillator is utilized but the regenerative frequency divider itself breaks into an oscillation in response to the loss of normal frequency control of the master oscillator and this oscillation acts through the phase discriminator (used for normal frequency control) and reactance tube to cause a fluctuation of the master oscillator frequency during which the master oscillator will lock in again and normal frequency control will be restored.

The foregoing and other objects of the invention will be better understood from the following description of some exemplifications thereof, reference being had to the accompanying drawings, wherein.

Figure 1:
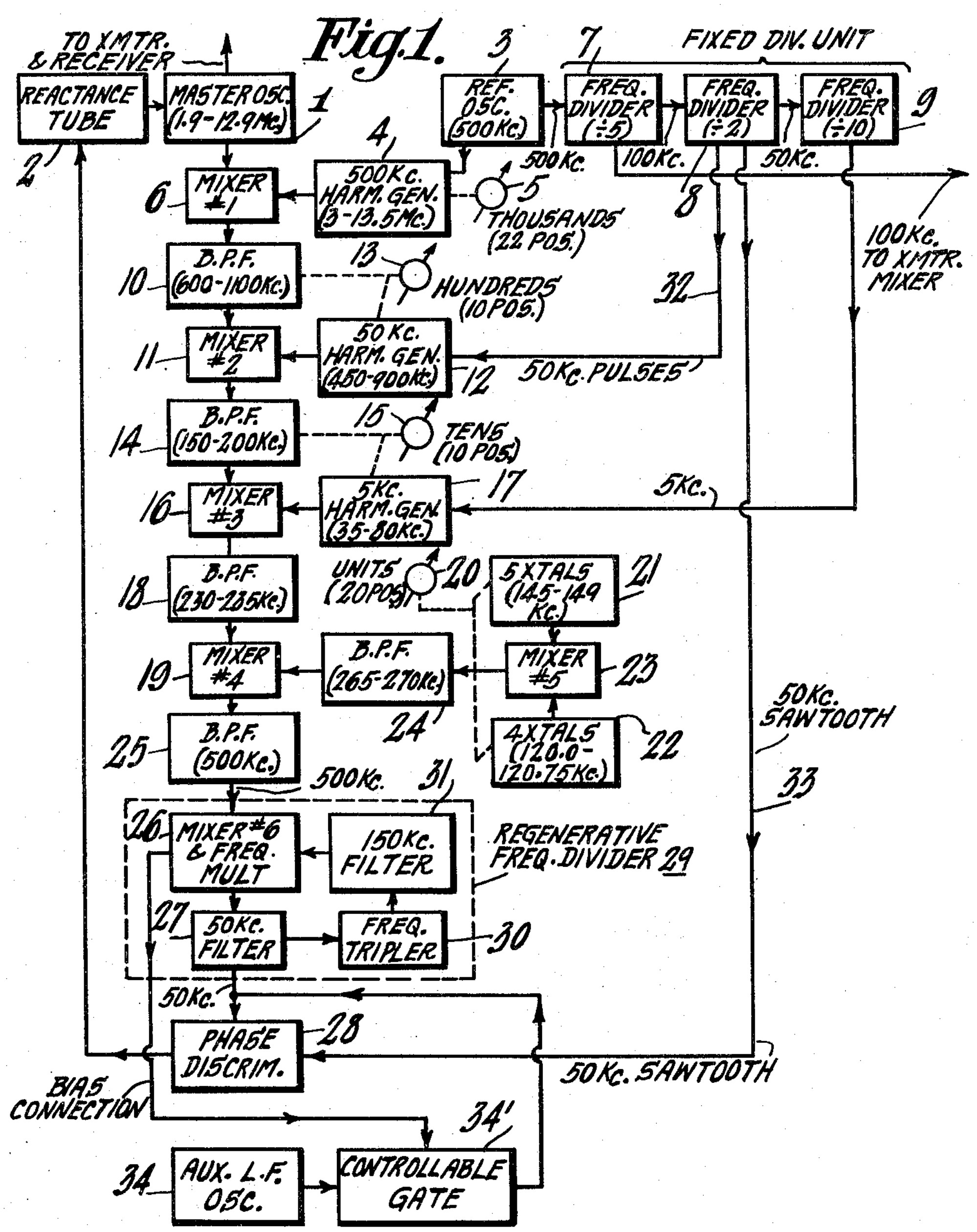
Fig. 1 is a block diagram of a frequency generator and control system utilizing one embodiment of this invention.

Referring now to Fig. 1, which illustrates a frequency generator or control system modified in accordance with the teaching of one embodiment of this invention, the master captive oscillator 1 is the oscillator that is automatically controlled in frequency by the frequency generator or control system illustrated, and the output of this oscillator is utilized for heterodyning purposes in the transmitter-receiver (not shown) with which the system illustrated is associated. The transmitter-receiver may for example be arranged as disclosed in my aforesaid copending application. The master (captive) oscillator 1 is arranged to be permeability tuned and has an output frequency of 1.9 to 12.9 mc. (in several bands), as indicated. Exact frequency control of oscillator 1 is obtained by means of reactance tube 2 coupled to oscillator 1.

The frequency control system illustrated utilizes harmonic generators excited from a crystal-stabilized oscillatory source. The heart of the unit which acts as the oscillatory source is a 500-kc. reference crystal-controlled oscillator 3 which is extremely stable. Output of 500 kc. from reference oscillator 3 drives a 500-kc. harmonic generator 4. Generator 4 is preferably of the two-stage type described and claimed in my copending application, Serial No. 253,141, filed October 25, 1951. A "Thousands" selection switch 5 has twenty-two positions and is mechanically coupled to a frequency selecting means in generator 4 so that any selected one of the sixth through twenty-seventh harmonics of the 500-kc. input to generator 4 may be passed from said generator to No. 1 mixer 6, depending upon the position of switch 5. Output from the master oscillator 1 is also supplied to the mixer 6 and this oscillator frequency, beating with the output frequency of generator 4 in such mixer, produces a difference frequency mixer output which may vary from 600 to 1100 kc., depending upon the frequency selection switch settings.

The 500-kc. output of oscillator 3 drives a series of cascaded locked-in oscillator frequency dividers, beginning with a 100-kc. locked-in oscillator 7 the output of which drives a 50-kc. stage 8 whose output, in turn, drives a 5-kc. stage 9. The 50-kc. stage 8 includes amplifier and pulse shaper circuits whereby 50-kc. pulses and a 50-kc. sawtooth wave may be derived from this stage for utilization in circuits to be later described.

The 600–1100 kc. difference frequency output of mixer 6 is passed through a bandpass filter 10 to provide one of the inputs to No. 2 mixer 11, the other input being provided from a 50-kc. harmonic generator 12. The generator 12 is supplied with 50-kc. pulse input derived from divider stage 8 over lead 32 and harmonics of this input frequency lying in the range of 450 to 900 kc. are selected by the "Hundreds" selection switch 13, which has ten positions. The particular harmonic of 50 kc. selected at the output of generator 12 depends of course upon the position of switch 13, and this selected harmonic is passed on to mixer 11 as input to mix with signal from filter 10. The selective circuit in filter 10 is tuned approximately by the "Hundreds" switch 13.

Output from mixer 11 is transferred, through the selective circuit bandpass filter 14, tunable in ten steps between 150 and 200 kc. as the "Tens" switch 15 (which has ten positions) determines, to No. 3 mixer 16. A 5-kc. harmonic generator 17 is supplied with 5-kc. input derived from divider stage 9 and harmonics of this input frequency lying in the range of 35 to 80 kc. are selected by the "Tens" switch 15. The particular harmonic of 5 kc. which is selected by switch 15 from generator 17, is passed on to mixer 16 as input to mix with signal from filter 14.

Output from mixer 16 is transferred through the bandpass filter 18, which passes a frequency band from 230 to 235 kc., to No. 4 mixer 19. The "Units" switch 20, which has twenty positions, selects crystals in crystal oscillator units 21 and 22. One of the group of four crystals from 120.0 to 120.75 kc. in oscillator 22 is selected, while one of the group of five crystals from 145 to 149 kc. in oscillator 21 is selected. The crystals in oscillator 22 have frequencies of 120.0, 120.25, 120.5 and 120.75 kc., while those in oscillator 21 have frequencies of 145, 146, 147, 148 and 149 kc. The outputs of the two crystal oscillators 21 and 22 excite No. 5 mixer 23, the switching actuated by "Units" switch 20 being arranged to produce output from mixer 23 of any one of twenty frequencies, spaced every 250 cycles in the range from 265 to 269.75 kc. A bandpass filter 24 couples this mixed crystal output to No. 4 mixer 19.

The output of No. 4 mixer 19 is nominally 500 kc. In other words, as the master oscillator 1 is scanned through a band of frequencies there will be one segment of the oscillator tuning range, corresponding to the settings of the switches 5, 13, 15 and 20 (which determine the selected frequencies fed to the several mixers) where a signal near 500 kc. will be developed in the output of mixer 19; this signal output in the vicinity of 500 kc. corresponds closely to the desired correct tuning of the master oscillator 1. A specific numerical example will make this clearer. Suppose that the master oscillator frequency is 3,462.5 kc. Then, the ninth harmonic of 500 kc. is selected in harmonic generator 4 and this 4500-kc. frequency combines in mixer 6 with the 3,462.5-kc. output of the master oscillator 1, giving a difference frequency of 1037.5 kc. which is passed through filter 10 to mixer 11. The seventeenth harmonic of 50 kc., which is 850 kc., is selected from harmonic generator 12 and this frequency combines with the 1037.5 kc. frequency in mixer 11 to give a difference frequency of 187.5 kc. which is passed through filter 14 to mixer 16. The ninth harmonic of 5 kc., which is 45 kc., is selected in harmonic generator 17 and this frequency combines with the 187.5-kc. frequency in mixer 16 to give a sum frequency of 232.5 kc. which is passed through filter 18 to mixer 19. In the oscillator 22, a frequency of 120.5 kc. is selected, while in the oscillator 21 a frequency of 147 kc. is selected. These latter two frequencies are mixed in mixer 23 to give a sum frequency of 267.5 kc. which is passed through filter 24 to mixer 19. This 267.5-kc. frequency combines with the 232.5-kc. frequency in mixer 19 to give a sum frequency of 500.0 kc. which is passed through a selective filter 25 (tuned to 500 kc.) to a mixer 26, in the latter to be divided down, in effect, to 50 kc., for example, which passes through a filter 27 to a phase discriminator 28. The mixer 26 constitutes part of a regenerative frequency divider 29 (indicated by the dotted-line enclosure which is so labeled) which is located between the output of filter 25 and phase discriminator 28, and which functions to divide the 500 kc. input thereto (from filter 25) by ten, to provide a 50 kc. output for phase discriminator 28.

The harmonic generator-mixer arrangement herein described is the same as disclosed in my said copending application Serial No. 257,148. The arrangement described constitutes a multi-channel frequency generator, providing 44,000 frequency channels for the master oscillator 1, one channel every 250 cycles in the range extending from 1.9 mc. to 12.9 mc. Each frequency channel is selected by the setting of the four switches 5, 13, 15 and 20.

The 50-kc. output of divider 29 is coupled as one input to phase discriminator 28, preferably through an amplifier and phase inverter arrangement (not shown). A 50-kc. sawtooth-shaped output derived from divider stage 8 over lead 33 is supplied as the other input to phase discriminator 28. In the phase detector or discriminator 28 a direct current control output results from the phase comparison of the 50-kc. signal from filter 27 and the 50- kc. sawtooth signal derived from the reference 50-kc. source 8. The control output of the phase discriminator is direct coupled (preferably through a cathode follower stage, not shown) to the grid of the reactance tube 2 for the master oscillator 1, in order to correct for frequency drifts of the master oscillator 1.

The foregoing constitutes an automatic frequency control system for the captive master oscillator 1, by means of which the master oscillator is stabilized in frequency by a phase discriminator 28 which compares the heterodyned output of oscillator 1 (heterodyned through cascaded mixers 6, 11, 16, 19 and 26) with the divided output of the reference crystal oscillator 3 (divided through dividers 7 and 8).

It is desired to be pointed out that the heterodyned frequencies originating from oscillator 1 and produced by the successive mixing steps in the mixers 6, 11, 16, 19 and 26 have to pass through all of the selective circuits 10, 14, 18 and 25. If there is a severe disturbance of a transient nature (due to a mechanical shock or a voltage surge, etc.) anywhere in the entire frequency control system, including all of the units 1–25, the 500-kc. signal may disappear entirely from the output of filter 25, or it may decrease to an unusable value, since due to the cascaded mixing arrangement described it is necessary that all signal-producing and signal-transferring units be operating properly, in order to produce a 500-kc. signal at the output of filter 25.

Even though the severe disturbances mentioned in the preceding paragraph may be only transient, the master oscillator may not lock-in to the crystal-derived frequencies when the cause of the disturbance is removed or has ceased to exist. This will now be explained with reference to Figure 2. With a phase discriminator-reactance tube frequency control of the type described, there is normally a rather extended "hold-in range" over which the master oscillator 1, once locked in, will hold under frequency control. In other words, the phase discriminator 28 will operate to provide a rather wide range of reactance control volts (on each side of nominal frequency represented by zero voltage) which, applied to reactance tube 2, will operate to hold under control the frequency of the master oscillator 1. This extended "hold-in range" is represented by the upper dotted line A in Figure 2, which extends over a rather wide range of "React. Control Volts," on either side (plus and minus) of the zero volts or "Nom." value.

This "hold-in range," however, is effective only for relatively slow variations such as those resulting from temperature or humidity changes of oscillator components, slow voltage changes, tube aging, etc. Thus, for slow variations or frequency drift trends of the master oscillator 1, the frequency of such captive oscillator will be held in control, by means of the phase discriminator-reactance tube combination, over a rather wide range of reactance control voltages, as indicated by the dotted line A in Figure 2. There is a much more limited "lock-in range" (indicated by the shaded rectangle B in Figure 2) contained within the "hold-in range" A, this "lock-in range" being characterized by the ability of the frequency generator or frequency control system of Figure 1 to initially (i. e., when the equipment is first turned on or when a new channel is selected and therefore an automatic tuning cycle of the oscillator takes place) lock in the frequency of the master captive oscillator 1, or to relock the frequency of the master oscillator after a transient disturbance (due to a mechanical shock or a voltage surge, etc.). The phase discriminator 28 thus provides only a small range of reactance control volts B (and correspondingly limited control) which, applied to reactance tube 2, will operate to initially lock in the master oscillator 1 or to relock this oscillator after a transient disturbance.

Now, let us suppose that due to slow component drifts of the master oscillator from the initial "lock-in" point, at which the "React. Control Volts" is zero or "Nom.," the reactance control voltage produced by phase discriminator 28, and effective on reactance tube 2, has a value such as to be outside the "lock-in range" B but well within the "hold-in range" A, such a value as represented by point C in Figure 2, for example. This is not at all an unusual situation. If, now, there is a severe transient disturbance due to a mechanical shock or a voltage surge, frequency control of the master oscillator will be momentarily lost and the master oscillator will "break out of lock," since the oscillator 1 will jump so far off its proper frequency (as a result of the disturbance) that it is outside the "hold-in range" A of the phase discriminator 28. When the cause of the disturbance is removed or has disappeared, even if the master oscillator then returns to approximately the same frequency it had immediately prior to the disturbance, control will not be re-locked, since the point C is outside the "lock-in range" B and since the reactance control voltage must lie within the range B in order to relock after a transient disturbance. Thus, frequency control of the master oscillator 1 is lost and the frequency of such oscillator will shift around erratically, since due to the necessity of adding a relatively unstable reactance tube 2 thereto in order to obtain a precision frequency control, the stability of the oscillator 1 is inherently impaired.

The foregoing description and explanation applies to a frequency generator and control system not utilizing the present invention. The reliability of a frequency generator and control system subjected to such transient disturbances as may be encountered, particularly in aircraft, for which the system is particularly adapted, is thus directly proportional to the extent of the "lock-in range," which is rather limited at B in Figure 2. The present invention enlarges this "lock-in range" B many fold, to an extent such as illustrated at B′, by the use of an oscillatory, sweep, or fluctuating voltage applied to the reactance tube 2 at any time when frequency control of the master oscillator 1 is not "locked-in." Thus, the upper dotted line A and the upper rectangle B (referred to in the above description) are labeled "with no sweep" (since for these characteristics the instant invention is not utilized) and the lower dotted line A′ (which is of the same extent as line A) and the lower rectangle B′ are labeled "with sweep," since these characteristics represent the present invention, utilizing the aforementioned sweep voltage.

According to the invention, the relatively low frequency sweep or fluctuating voltage which, as stated, is applied to the reactance tube 2 whenever the master oscillator 1 frequency is not "locked-in," sweeps the master oscillator frequency either side of nominal or zero reactance control volts, and during said sweep the master captive oscillator frequency passes through the cascaded series of mixers and associated bandpass filters 6, 10, 11, 14, 16, 18, 19, 25, 26 and 27, and reestablishes the frequency control or re-locks the master oscillator, the locking in of the master oscillator cutting off the sweep voltage. The details of the operation of this sweep voltage will become apparent as the description proceeds.

The frequency divider 29, previously referred to briefly, is of the regenerative type. The 500-kc. output from filter 25 is coupled to the regenerative frequency divider 29, comprising No. 6 mixer 26 the output of which is fed to a 50-kc. filter or output tank 27, the divider also including a frequency tripler 30 which receives output from filter 27, and a 150-kc. filter or tank 31 which receives output from tripler 30 and transfers its output signal to the input side of mixer 26, which also functions as a frequency multiplier to multiply the 150-kc. signal received from filter 31 to a frequency of 450 kc. to beat with the 500-kc. signal received from filter 25, thereby producing the 50 kc. required for filter 27. This regenerative frequency divider operates, in effect, to divide the 500-kc. signal at the output of filter 25 down to a frequency of 50 kc. at the output of filter 27. This provides a frequency division ratio of ten.

The preceding paragraph describes a preferred form of the regenerative frequency divider 29, which form will be referred to hereinafter in connection with the detailed circuit diagram of Fig. 5. However, in a regenerative divider now to be referred to in connection with Fig. 3, the arrangement is slightly different. In this form, the unit 26 is only a mixer, the unit 30 multiplies by nine instead of only tripling, and the unit 31 coupled to the output of multiplier 30 is a 450-kc. tank. Again, such a regenerative frequency divider operates, in effect, to divide the 500-kc. signal at the output of filter 25 down to a frequency of 50 kc. at the output of filter 27, providing a frequency division ratio of ten.

According to a first embodiment of this invention, an auxiliary low frequency oscillator 34 is controllably gated on and off by means of a bias connection 35 coupled to the mixer 26 (which, as previously stated, in this embodiment is only a mixer and not also a frequency multiplier) of regenerative frequency divider 29 and controlling a controllable gate 34' which is coupled between the output of oscillator 34 and the phase discriminator 28. Oscillator 34 preferably is an audio oscillator operating at a frequency on the order of 150 cycles per second. The output of oscillator 34 is applied through discriminator 28 to reactance tube 2, when gate 34' is open, to modulate or sweep the frequency of master oscillator 1 by the oscillatory wave output of auxiliary oscillator 34.

Auxiliary oscillator 34 may be of any type, producing either a sine wave or a non-sinusoidal output (such as a sawtooth). The output waveform of this oscillator is not critical. However, the auxiliary oscillator frequency must be relatively low with reference to the time constant around the frequency control loop of the master oscillator.

Figure 3:
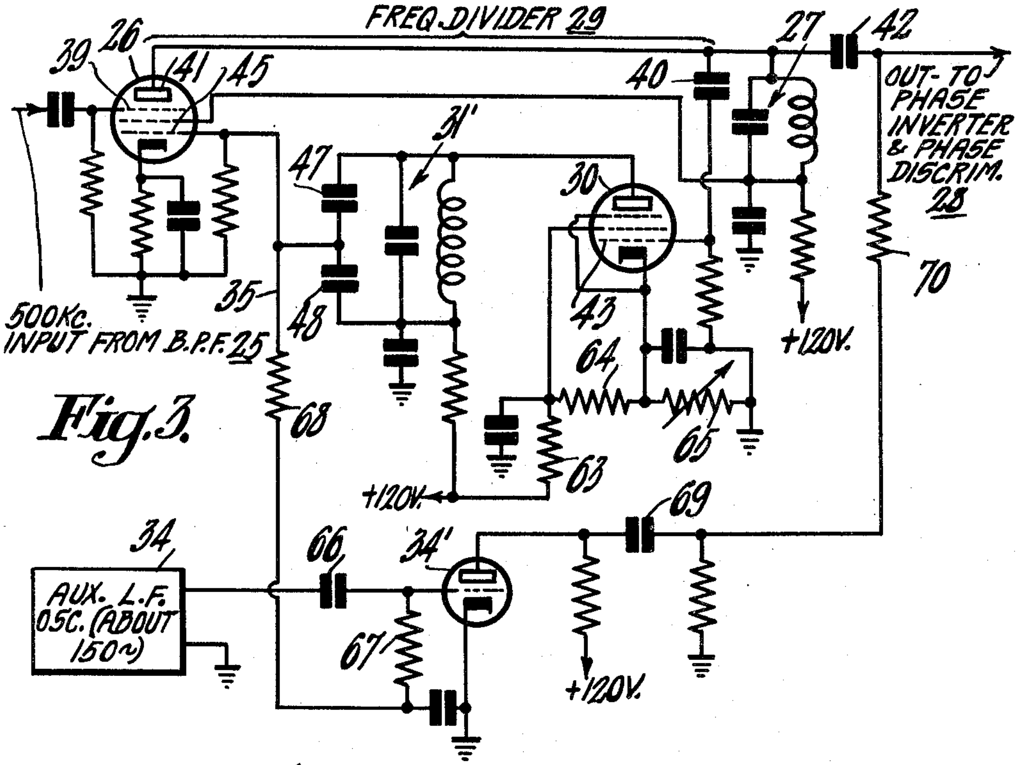
Fig. 3 is a detailed circuit diagram illustrating the Fig. 1 embodiment.

Now referring to Fig. 3, which is a detailed schematic of the first embodiment of the invention including regenerative frequency divider 29, auxiliary oscillator 34 and gate 34', 500-kc. output from bandpass filter 25 is applied through a coupling capacitor to the suppressor grid 39 of No. 6 mixer tube 26, which constitutes the first stage of regenerative frequency divider 29 and which is a pentode vacuum tube. A resonant filter circuit 27, tuned to 50 kc., is connected directly to the anode 41 of tube 26. The 500-kc. signal applied to grid 39 of tube 26 is in effect divided down to 50 kc. at the anode 41 of tube 26, and this 50-kc. signal (selectively passed by tuned circuit 27) is taken off from anode 41 by means of a coupling capacitor 42 and applied as one input to the phase discriminator 28, preferably by way of a phase inverter (not shown in Fig. 3). This 50-kc. signal passing through capacitor 42 constitutes the output of frequency divider 29.

The 50-kc. signal appearing at anode 41 is also applied through a coupling capacitor 40 to the control grid 43 of the frequency multiplier tube 30, which also is a pentode vacuum tube. Tube 30 is biased so that it operates as a frequency multiplier, multiplying by a factor of nine to produce a 450-kc. signal from the 50-kc. signal input thereto, this 450-kc. signal being selectively passed by means of a resonant filter circuit 31' connected directly to the anode of tube 30 and tuned to 450 kc. The 450-kc. signal appearing at the anode of tube 30 is applied, by way of a capacitive divider including two capacitors 47 and 48 connected in series across circuit 31', to the control grid 45 of tube 26.

As previously stated, in this embodiment of the invention tube 26 functions as a mixer, to mix the 450-kc. signal received from the anode of multiplier 30 (by way of filter 31') with the 500-kc. signal received from filter 25, thereby producing a 50-kc. signal at anode 41 which is transmitted on to phase discriminator 28 for utilization therein. The regenerative frequency divider described, during its normal operation, divides the 500-kc. input signal applied to grid 39 down to a 50-kc. signal at the anode 41 (across tuned circuit 27), effecting a division by ten.

The 50-kc. output signal from divider 29 is applied to a phase detector or discriminator 28 (not shown in Fig. 3), for phase comparison therein with a standard or reference 50-kc. signal. This latter signal has a sawtooth-shaped waveform and is derived from the frequency divider stage 8 of Fig. 1 and is applied by lead 33 to the phase discriminator 28. The D. C. control output of the discriminator results from the phase comparison of the 50-kc. sawtooth reference wave and the 50-kc. signal from divider 29. This D. C. control output is applied to the grid of the reactance tube 2 to control the frequency of the master oscillator 1. In this way, during normal operation of the transmitter-receiver of this invention, the phase discriminator 28 very accurately controls the frequency of master 1, a correcting voltage out of the phase discriminator appearing whenever oscillator 1 tends to drift in frequency; the frequency of this oscillator is then maintained very accurately at its proper value by the phase comparison with a highly stable crystal-controlled frequency. The phase discriminator 28 has the "hold-in range" A and the "lock-in range" B already described in connection with Fig. 2.

The characteristics of the regenerative frequency divider 29, comprising mixer 26 and multiplier stage or harmonic generator 30, are such that under normal frequency control of oscillator 1 (when conditions are normal, that is, when oscillator 1 is being "held in control" so that there is a 500-kc. signal of the proper magnitude at the output of bandpass filter 25) the negative voltage on the control grid 45 of the mixer 26 is rather high. However, when there is a severe disturbance anywhere in the entire frequency control system, the master captive oscillator breaks out of lock, resulting in a loss of 500-kc. input at the output of filter 25 (input to mixer 26), or in the decrease of this 500-kc. signal to an unusable value, as explained hereinabove. Since frequency divider 29 is of the regenerative type, this loss of 500-kc. input to such divider produces a marked change in the operation of such divider, as compared to the normal operation thereof. In fact, the loss of 500-kc. input to mixer 26 causes a marked drop in the negative bias voltage on control grid 45 of the mixer tube 26.

It should be noted that in Fig. 3 a positive bias is applied to the cathode of tube 30, by means of a voltage divider including two fixed resistors 63 and 64 and an adjustable resistor 65, all connected in series between the positive terminal and ground, the said cathode being connected to the junction of resistors 64 and 65. The gain of the harmonic generator tube 30 must be reduced, by means of this cathode bias, to prevent self-oscillation of the regenerative divider 29.

In accordance with the first embodiment of this invention, the change of grid bias on mixer stage 26, in response to the breaking-out of lock of master oscillator 1 (as the result of a transient disturbance, for example) is used to gate the output of an auxiliary low frequency sweep oscillator 34 (for example, an audio oscillator operating at about 150 cycles) on or off, by means of bias connection 35.

The output of oscillator 34 is applied through a coupling capacitor 66 to the grid of a controllable oscillator gate 34', which is a sharp-cutoff vacuum triode. This triode is controlled from the grid voltage on control grid 45 of mixer 26 of the regenerative divider 29, by means of a connection extending from the lower end of leak resistor 67, through a resistor 68 to the bias connection 35 which is coupled directly to grid 45 of the mixer tube 26. The output of gate 34' is applied to phase discriminator 28, by means of a connection from the anode of tube 34' through a capacitor 69 and a resistor 70, to the phase inverter (phase discriminator) side of capacitor 42.

The high negative bias on grid 45 under normal frequency control of oscillator 1, is applied to gate 34' and cuts off or closes this gate, the gate then functioning to cut off the low frequency sweeping voltage (output of oscillator 34) from the phase discriminator 28 when the 500 kc. input to divider 29 is stabilized by the "lock-in" of the master oscillator 1 and the related locking-in of the regenerative frequency divider.

The lower negative bias on grid 45 in response to "break-out" of oscillator 1, is also applied to gate 34' and this opens this gate, the low frequency output of oscillator 34 then being applied through tube 34' to the phase discriminator 28.

Referring again to Fig. 1, when gate 34' is thus opened the output of the low frequency sweep oscillator 34 is applied to the phase discriminator 28 by way of the connection including components 69 and 70, and this signal of about 150 C. P. S. reappears at the output of the phase discriminator, since no reference, counteracting signal of this frequency is applied to the phase discriminator. Thus, the output of the auxiliary low frequency oscillator 34 reaches the reactance tube 2, causing the 150-cycle output of such oscillator (when the gate 34' is opened in the manner previously described) to sweep or modulate in frequency the master oscillator, either side of its nominal frequency.

The circuit of this first embodiment operates in the following manner: when the master oscillator 1 breaks out of lock for any reason (for example, as the result of a severe transient disturbance), the marked drop in bias voltage on grid 45 turns on gate tube 34', permitting the output of the auxiliary LF sweep oscillator 34 to sweep the master oscillator frequency either side of nominal. During this sweeping process the master oscillator frequency will go through such a frequency value that the said frequency, passing through the series of mixers and associated bandpass filters described, will re-establish or re-lock the frequency control and the master oscillator 1 will then be relocked in. The locking-in of the master oscillator results in a marked increase of the negative voltage on grid 45, which biases off gate tube 34' and thus effectively stops the sweeping of the master oscillator. Conditions are then again normal.

Figure 2:
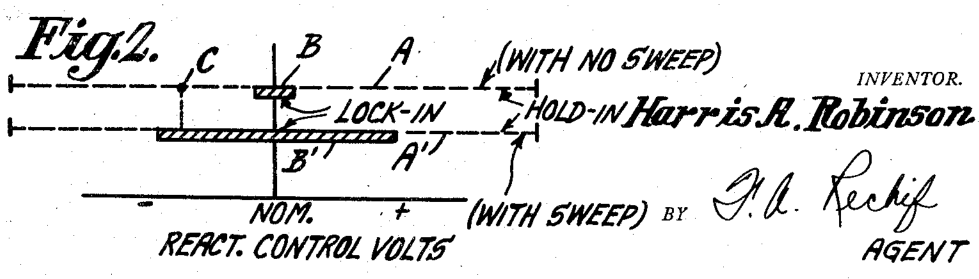
Fig. 2 is a diagram useful in explaining certain features of the invention.

The above-described sweep of the master oscillator frequency whenever such oscillator is not "locked-in" effectively enlarges many fold the "lock-in range" of the frequency control system. This is illustrated in Fig. 2, wherein the shaded rectangle B' represents the extent of the "lock-in range" with sweep according to this invention, and this extent is many fold greater than the "lock-in range" B, with no sweep. The dotted line A' represents the "hold-in range" with sweep; it will be seen that this is of exactly the same extent as the "hold-in range" A, with no sweep. When a sweeping voltage is thus used according to this invention, even if there has been slow component drift of oscillator 1 such that the reactance control volts has a value as represented by point C, and if a severe transient disturbance then occurs such as to cause oscillator 1 to break out of lock, relocking will easily be effected since the point C is well within the enlarged "lock-in range" B' resulting from the utilization of sweep according to this invention.

In another and preferred embodiment of the invention, now to be discussed in connection with Figs. 4 and 5, the auxiliary low frequency oscillator 34 and gate 34' are dispensed with and the regenerative frequency divider 29 itself is used as a source of auxiliary sweeping voltage. The frequency divider can be made to function in this manner by proper selection of LC values in the tuned circuits and of gain around the regenerative loop. In other words, in this embodiment the inherent self-oscillation of the regenerative frequency divider 29 (already available in the frequency control system disclosed) is utilized via the phase discriminator 28 to provide a low frequency sweeping signal for master oscillator 1, whenever frequency control has been lost, or when such oscillator is not "locked in."

Figure 4:
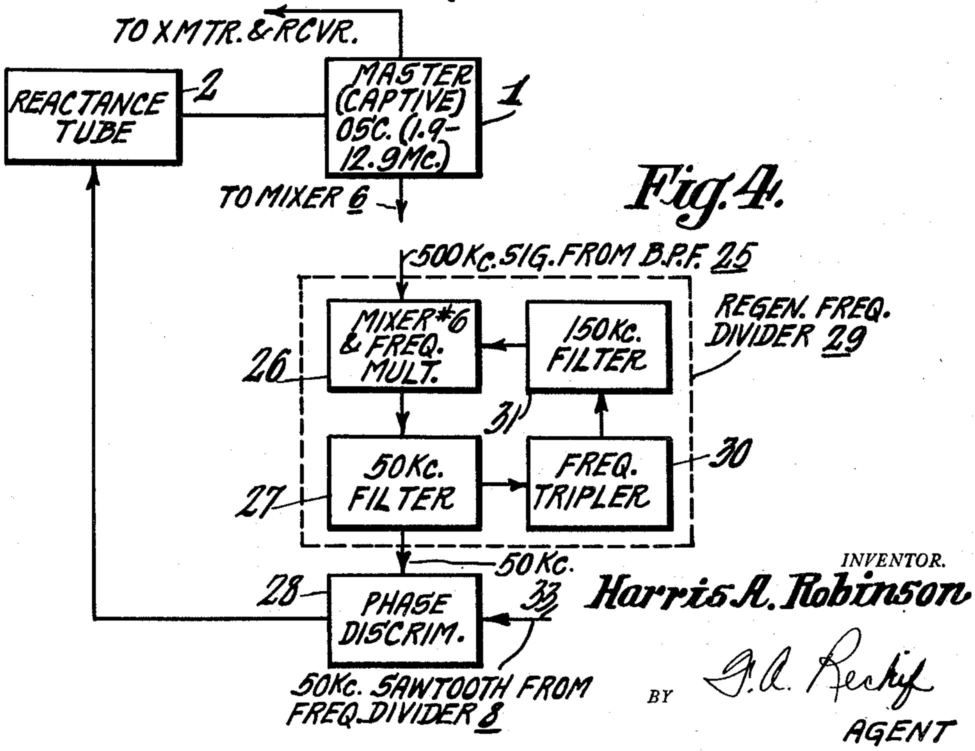
Fig. 4 is a partial block diagram illustrating another, and preferred, embodiment of the invention.

Now referring to Fig. 4, which is a partial (simplified) block diagram of the preferred embodiment previously referred to, it may be seen that Fig. 4 is a simplified diagram of the Fig. 1 system, the auxiliary low frequency oscillator 34, the gate 34', and the bias control connection 35 being omitted from the Fig. 4 embodiment. Many of the circuits of Fig. 1 have been omitted from Fig. 4, except for the terminal connections, in order not to clutter the drawing unduly. The 500-kc. signal from bandpass filter 25 is applied to the input of regenerative frequency divider 29 (which consists of units 26, 27, 30 and 31 arranged as in Fig. 1), and the 50-kc. output of this divider is applied to phase discriminator 28, along with the 50-kc. sawtooth reference frequency, which latter is applied to phase discriminator 28 by means of connection 33. The control voltage output of phase discriminator 28 is applied to reactance tube 2, by means of a cathode follower stage as will be subsequently described, in order to control or vary (as well as sweep) the frequency of the master (captive) oscillator 1.

Figure 5:
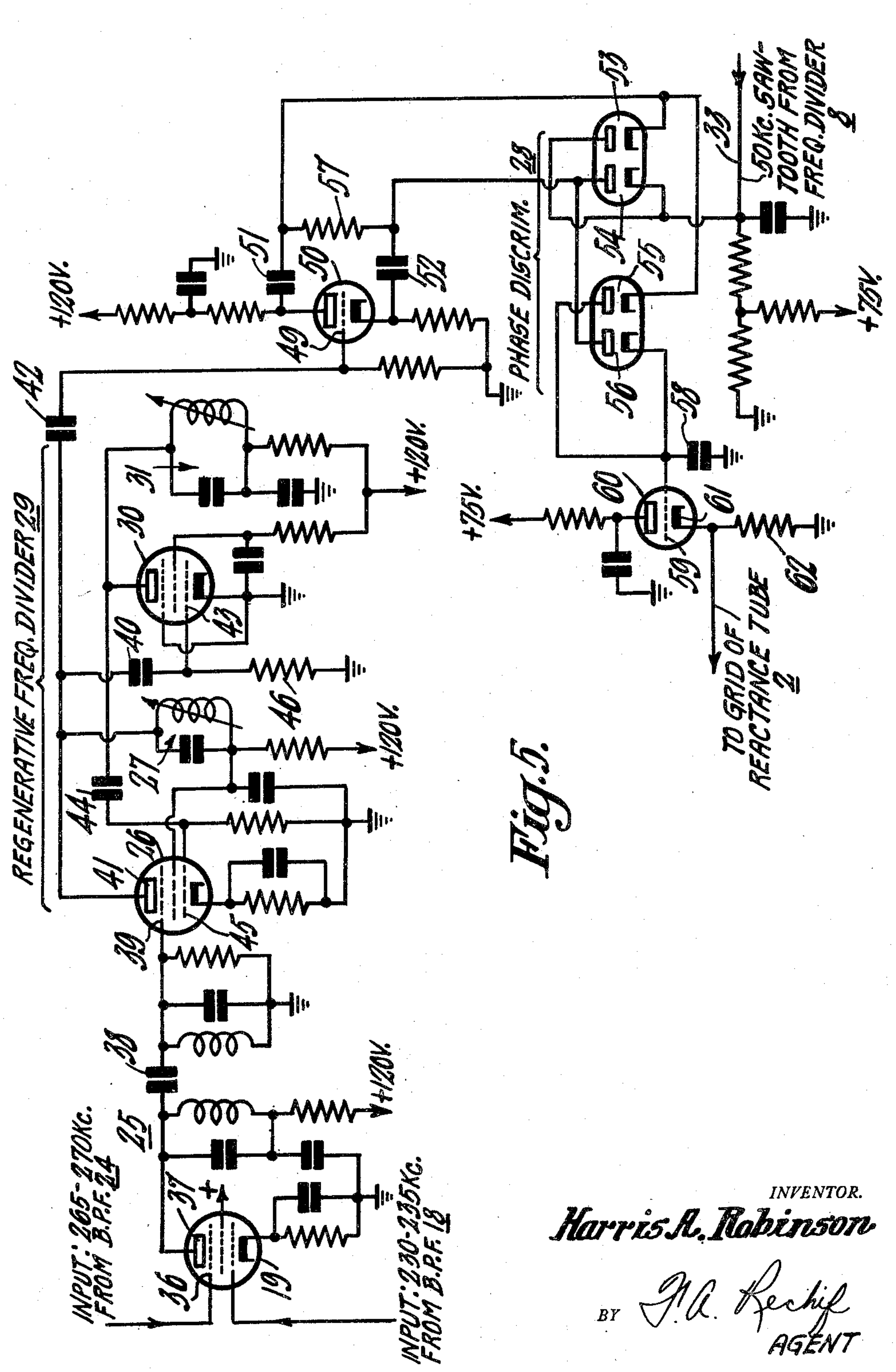
Fig. 5 is a detailed circuit diagram illustrating the Fig. 4 embodiment.

Now referring to Fig. 5, which is a detailed schematic of the second (and preferred) embodiment of the invention, including regenerative frequency divider 29, phase discriminator 28, mixer 19 and filter 25, the output of bandpass filter 18, which is a signal within the 230–235 kc. range, is applied to the No. 1 grid of No. 4 mixer tube 19 and the output of bandpass filter 24, which is a signal within the 265–270 kc. range, is applied to the suppressor grid 36 of tube 19, which tube is a pentode vacuum tube. The two frequencies applied to tube 19 are mixed therein, and the beat (sum) frequency of 500 kc. appears at anode 37 of this tube, as well as other beat frequencies.

The 500-kc. frequency is selected from the output or anode circuit of mixer 19 by means of the bandpass filter 25 tuned to pass 500 kc. and consisting of two resonant circuits tuned to 500 kc. and coupled together by means of a capacitor 38, one of these two resonant circuits (on one side of capacitor 38) being connected directly to anode 37 and the other of these two circuits (on the other side of capacitor 38) being connected directly to the suppressor grid 39 of No. 6 mixer tube 26, which constitutes the first stage of regenerative frequency divider 29 and which is a pentode vacuum tube. Mixer tube 26 serves as a mixer and frequency multiplier. A resonant filter circuit 27, tuned to 50 kc. is connected directly to the anode 41 of tube 26. The 500-kc. signal applied to grid 39 of tube 26 is in effect divided down to 50 kc. at the anode 41 of tube 26, and this 50-kc. signal (selectively passed by tuned circuit 27) is taken off from anode 41 by means of a coupling capacitor 42 and applied as one input to the phase discriminator 28. This 50-kc. signal passing through capacitor 42 constitutes the output of frequency divider 29.

The 50-kc. signal appearing at anode 41 is also applied through a coupling capacitor 40 to the control grid 43 of the frequency tripler tube 30, which also is a pentode vacuum tube. Tube 30 is biased so that it operates as a frequency tripler, producing a 150-kc. signal from the 50-kc. signal input thereto, this 150-kc. signal being selectively passed by means of a resonant filter circuit 31 connected directly to the anode of tube 30 and tuned to 150-kc. The 150-kc. signal appearing at the anode of tube 30 is applied through a coupling capacitor 44 to the control grid 45 of tube 26.

As previously stated, tube 26 functions in effect as a frequency multiplier to multiply the 150-kc. signal received from the anode of tripler 30, by way of filter 31, to a frequency of 450 kc. which beats, in tube 26, with the 500-kc. signal received from filter 25, thereby producing a 50-kc. signal at anode 41 which is transmitted on to phase discriminator 28 for utilization therein.

In the regenerative frequency divider 29 as disclosed herein, the tripler 30 drives the mixer 26 very hard, gating the 500-kc. input signal to tube 26 (from filter 25) at a 150-kc. rate (the frequency of the signal at the anode of tube 30, selected by filter 31), resulting in a strong 50-kc. component in the mixed anode current (of anode 41), and hence a 50-kc. voltage across the 50-kc. tuned circuit 27. Thus, the regenerative frequency divider 29, during its normal operation, divides the 500-kc. input signal applied to grid 39 down to a 50-kc. signal at the anode 41 (across tuned circuit 27), effecting a division by ten.

The 50-kc. energy which is selected by filter 27 is passed through coupling capacitor 42 to the grid 49 of a phase inverter triode 50. The amplifier and phase inverter tube 50, to the grid of which the 50-kc. signal from mixer 26 and filter 27 is applied, amplifies the 50-kc. signal and provides 50-kc. balanced push-pull output which is utilized as signal input to the quadruple diode phase detector or phase discriminator 28, through coupling capacitors 51 and 52. The four diodes of the phase discriminator are denoted by numerals 53, 54, 55 and 56. One of the 50-kc. outputs of phase inverter 50 goes through capacitor 51 to the cathodes of diodes 53 and 55, while the other push-pull or antiphasal output goes through capacitor 52 to the anodes of diodes 54 and 56 and through a resistor 57 to the cathode of diode 53. For phase comparison with the approximately 50-kc. signal input from inverter 50, a standard or reference 50 kc. sawtooth-shaped input, derived from the frequency divider stage 8 of Figure 1, is applied by lead 33 to the cathode of diode 54 and to the anode of diode 53. In the phase detector or discriminator 28, the D. C. control output results from the phase comparison of the 50-kc. sawtooth reference wave and the 50-kc. signal from inverter 50.

The D. C. control output of phase discriminator 28 is taken from the joined-together cathode of diode 56 and the anode of diode 55. Filtered by the capacitor 58, the phase discriminator output is direct coupled to the grid 59 of a triode 60 connected as a cathode follower amplifier stage. A resistor 62 is connected from the cathode 61 of tube 60 to ground.

From the cathode 61 of the cathode follower, the D. C. control output of the phase discriminator 28 is applied to the grid of the reactance tube 2 to control the frequency of the master oscillator 1. In this way, during normal operation of the transmitter-receiver of this invention, the phase discriminator 28 very accurately controls the frequency of master oscillator 1, a correcting voltage out of the phase discriminator appearing whenever oscillator 1 tends to drift in frequency; the frequency of this oscillator is then maintained very accurately at its proper value by the phase comparison with a highly stable crystal controlled frequency. The phase discriminator just described has the "hold-in range" A and the "lock-in range" B already described in connection with Figure 2.

The characteristics of the regenerative frequency divider 29, comprising No. 6 mixer 26 and tripler stage 30, are such that under normal frequency control of oscillator 1 (when conditions are normal, that is, when oscillator 1 is being "held in control" so that there is a 500-kc. signal of the proper magnitude at the output of bandpass filter 25) the voltage on the control grid 43 of the tripler 30 is relatively high, a negative voltage of approximately twenty volts then being developed here. However, when there is a severe disturbance anywhere in the entire frequency control system, the master captive oscillator breaks out of lock, resulting in a loss of 500-kc. input at the output of filter 25 (input to mixer 26), or in the decrease of this 500-kc. signal to an unusuable value, as explained hereinabove. Since frequency divider 29 is of the regenerative type, this loss of 500-kc. input to such divider produces a marked change in the operation of such divider, as compared to the normal operation thereof. In fact, the loss of 500-kc. input to mixer 26 causes a marked drop in the bias voltage on control grid 43 of the tripler tube 30, to approximately four volts negative.

The components in the LC tuned circuit 27 have such values that this circuit has a Q on the order of 35, while the components in the 150-kc. tuned circuit or tank 31 have such values that this circuit has a Q on the order of 50. It may be stated that the tripler or harmonic generator tube 30 has the output voltage developed across its tank circuit 31 coupled by the mixer 26 and the relatively broad 50-kc. tank 27 back to the grid 43 of the former, completing the feedback loop. This feedback loop provides sufficient gain to start and sustain oscillation with a frequency approximating 150-kc. with a screen grid voltage on tube 30 as low as three or four volts. As the screen grid voltage on tube 30 (and the tube transconductance) is increased, the oscillation described takes on the nature of a self-quenched super-regenerative oscillation, in which the RC time constant of the grid circuit 46, 40 determines the relaxation or quenching frequency. As the C of capacitance 40 is raised, the relaxation quenching frequency is lowered. The resulting oscillatory energy thus developed in divider 29 is spread over a wide frequency spectrum. Components of this oscillatory energy which shock-excite the 50-kc. tank circuit 27 are passed on to the phase discriminator 28 as one of the inputs thereto.

In phase discriminator 28, the unstable fluctuating output frequency out of divider 29 (under these conditions) is compared with the stable 50-kc. reference frequency from divider 8, resulting in a fluctuating voltage output (actually, a random beat frequency, since the relaxation oscillation consists of various random frequencies) which is supplied to the reactance tube 2. This fluctuating voltage output out of discriminator 28 has a predominant low frequency component which, applied to the reactance tube 2, produces a fluctuation of the master oscillator 1 around its normal frequency. Thus, in this embodiment the regenerative divider 29 itself is used as a source of the auxiliary voltage which sweeps or fluctuates the frequency of the master oscillator. As a result of this fluctuation or sweep of the master oscillator frequency, the beat frequency out of mixer 19 is fluctuated or swept, and at some time during this fluctuation the frequency of the master oscillator is re-locked so that frequency control is re-established. The locking-in of the master oscillator, or the re-establishing of the frequency control, results in the reappearance of the 500-kc. signal at the input of divider 29, "driving" this divider, producing a high negative voltage on grid 43 and cutting off the relaxation oscillation. The sweeping or fluctuation of the master oscillator frequency then stops and the tubes 26 and 30 function normally, as a frequency divider.

To briefly summarize the foregoing operation, when the master oscillator 1 is "locked in" the frequency divider 29 functions as such, developing a high negative voltage on grid 43 which prevents any relaxation oscillation. When the oscillator 1 "breaks out of lock," the 500-kc. input signal to the divider fails and the negative voltage on grid 43 drops, causing a relaxation oscillation to start in regenerative divider 29, which in turn produces a fluctuation of the master oscillator frequency during which the oscillator again locks in. When it does so, the relaxation oscillation is cut off and the regenerative frequency divider again operates normally.

The sweep or fluctuation of the master oscillator frequency whenever the oscillator is not "locked in" (using the frequency divider itself as the source of auxiliary sweeping voltage, in the system of Figs. 4–5) effectively enlarges many fold the "lock-in range" of the frequency control system, just as previously explained in connection with Figs. 1 and 2. In Fig. 2, the rectangle B′ represents the extent of the "lock-in range" with sweep according to Fig. 4, and it will be seen that this is much greater in extent than the "lock-in range" B with no sweep.

In another embodiment of the invention the regenerative frequency divider 29, used as a source of auxiliary sweeping voltage, is of the more conventional type, similar to Fig. 3. In this arrangement the frequency multiplier 30 multiplies by nine times the 50 kc. input thereto, instead of the tripling action described in connection with Figs. 4–5. The output of the frequency multiplier 30 is fed to a filter 31′ tuned to the ninth harmonic or 450 kc. (as in Fig. 3) and the mixer 26 is not required to perform any frequency multiplication. Again, in this arrangement (as in Figs. 4–5) the choice of circuit constants and gain around the feedback loop permits the development of a relaxation oscillation when the master oscillator is out of "lock." The resulting fluctuating voltage output of phase discriminator 28 sweeps the master oscillator to reestablish "lock-in."

The following are representative values for a circuit built according to Fig. 3 and successfully tested.

| | |
|---|---|
| Tube **26** | 5636. |
| Tube **30** | 5840. |
| Tube **34′** | 5719. |
| Capacitor **40** | 10 mmfd. |
| Capacitor **42** | 47 mmfd. |
| Capacitor **47** | 330 mmfd. |
| Capacitor **48** | 47 mmfd. |
| Capacitor **66** | 0.01 mfd. |
| Capacitor **69** | 0.01 mfd. |
| Resistor **63** | 68 K ohms. |
| Resistor **64** | 22 K ohms. |
| Resistor **67** | 470 K ohms. |
| Resistor **68** | 1 megohm. |
| Resistor **70** | 1 megohm. |

The following are representative values for a circuit built according to Fig. 5 and successfully tested.

| | |
|---|---|
| Tube **26** | 5636. |
| Tube **30** | 5840. |
| Resistor **46** | 1 megohm. |
| Capacitor **38** | 10 mmfd. |
| Capacitor **40** | 22 mmfd. |
| Capacitor **42** | 22 mmfd. |
| Capacitor **44** | 22 mmfd. |
| Inductance of ckt. **27** | 9.5–10 mh. (adjustable). |
| Inductance of ckt. **31** | 9.5–10 mh. (adjustable). |

What is claimed is:

1. In combination, an oscillator the frequency of which is to be controlled, a regenerative frequency divider coupled to the output of said oscillator, means coupled to the output of said divider for locking the frequency of said oscillator to a predetermined frequency established by a stable frequency source, said means having a normal lock-in range of limited extent over which the oscillator frequency is initially locked in by said means, said divider being constructed and arranged to develop a voltage change therein in response to the breaking-out of lock of said oscillator frequency, and means responsive to said voltage change for sweeping said oscillator frequency through a range greater than said normal lock-in range to re-establish frequency control of said oscillator.

2. In combination, an oscillator the frequency of which is to be controlled, a regenerative frequency divider coupled to the output of said oscillator, and means coupled to the output of said divider for locking the frequency of said oscillator to a predetermined frequency established by a stable frequency source, said means having a normal lock-in range of limited extent over which the oscillator frequency is initially locked in by said means, said divider being constructed and arranged to develop therein a wave of random frequency in response to the breaking-out of lock of said oscillator frequency, the application of the random frequency wave output of said divider to said locking means causing corresponding frequency modulation of said oscillator.

3. In combination, an oscillator the frequency of which is to be controlled, voltage-responsive frequency controlling means coupled to said oscillator, a regenerative frequency divider coupled to the output of said oscillator, a phase discriminator having two inputs, means applying the output of said divider as one input to said discriminator, means for applying a wave of stable frequency as the other input to said discriminator, means for applying the voltage output of said discriminator to said frequency controlling means, the combination of said phase discriminator and said frequency controlling means providing a normal lock-in range of limited extent over which the oscillator frequency is initially locked in, said divider being constructed and arranged to develop a voltage change therein in response to the breaking-out of lock of said oscillator frequency, and means responsive to said voltage change for sweeping said oscillator frequency through a range greater than said normal lock-in range.

4. In combination, an oscillator the frequency of which is to be controlled, voltage-responsive frequency controlling means coupled to said oscillator, a regenerative frequency divider coupled to the output of said oscillator, a phase discriminator having two inputs, means applying the output of said divider as one input to said discriminator, means for applying a wave of stable frequency as the other input to said discriminator, and means for applying the voltage output of said discriminator to said frequency controlling means, the combination of said phase discriminator and said frequency controlling means providing a normal lock-in range of limited extent over which the oscillator frequency is initially locked in, said divider being constructed and arranged to develop therein a wave of random frequency in response to the breaking-out of lock of said oscillator frequency, the application of the random frequency wave output of said divider to said phase discriminator causing corresponding frequency modulation of said oscillator.

5. In combination, an oscillator the frequency of which is to be controlled, a regenerative frequency divider coupled to the output of said oscillator, means coupled to the output of said divider for locking the frequency of said oscillator to a predetermined frequency established by a stable frequency source, said means having a normal lock-in range of limited extent over which the oscillator frequency is initially locked in by said means, said divider being constructed and arranged to develop a voltage change therein in response to the breaking-out of lock of said oscillator frequency, an auxiliary oscillator operatively arranged to sweep the frequency of said controlled-frequency oscillator through a range greater than said normal lock-in range, and means coupling said auxiliary oscillator to said divider to render operative said oscillator in response to said voltage change.

6. In combination, an oscillator the frequency of which is to be controlled, voltage-responsive frequency controlling means coupled to said oscillator, a regenerative frequency divider coupled to the output of said oscillator, a phase discriminator having two inputs, means applying the output of said divider as one input to said discriminator, means for applying a wave of stable frequency as the other input to said discriminator, means for applying the voltage output of said discriminator to said frequency controlling means, the combination of said phase discriminator and said frequency controlling means providing a normal lock-in range of limited extent over which the oscillator frequency is initially locked in, said divider being constructed and arranged to develop a voltage change therein in response to the breaking-out of lock of said oscillator frequency, an auxiliary oscillator operatively arranged to sweep the frequency of said controlled-frequency oscillator through a range greater than said normal lock-in range, and means coupling said auxiliary oscillator to said divider to render operative such oscillator in response to said voltage change.

7. In combination, an oscillator the frequency of which is to be controlled, at least one mixer excited by waves from said oscillator and by waves of stable frequency to produce beat frequency resultant waves, a regenerative frequency divider coupled to the output of said mixer, means coupled to the output of said divider, and responsive to variations in the frequency of said resultant waves from a predetermined value, for controlling the frequency of said oscillator, and means responsive to a voltage change occurring in said divider in response to the decrease below a usable amplitude level of the resultant waves applied to said divider, for sweeping the frequency of said oscillator through a certain range.

8. In combination, an oscillator the frequency of which is to be controlled, at least one mixer excited by waves from said oscillator and by waves of stable frequency to produce beat frequency resultant waves, a regenerative frequency divider coupled to the output of said mixer, means coupled to the output of said divider and responsive to variations in the frequency of said resultant waves from a predetermined value, for controlling the frequency of said oscillator, an auxiliary oscillator operatively arranged to sweep the frequency of said controlled-frequency oscillator through a certain range, and means coupling said auxiliary oscillator to said divider to render operative such oscillator in response to a voltage change occurring in said divider in response to the decrease below a usable amplitude level of the resultant waves applied to said divider.

9. In combination, an oscillator the frequency of which is to be controlled, at least one mixer excited by waves from said oscillator and by waves of stable frequency to produce beat frequency resultant waves, means responsive to variations in the frequency of said resultant waves from a predetermined value for controlling the frequency of said oscillator, a regenerative frequency divider coupled to said mixer, said divider operating to develop therein a wave a random frequency in response to the decrease below a usable amplitude level of the resultant waves applied to said divider, and means coupling said divider to said controlling means to frequency modulate said oscillator by output produced by said random frequency wave.

10. In combination, an oscillator the frequency of which is to be controlled, voltage-responsive frequency controlling means coupled to said oscillator, at least one mixer excited by waves from said oscillator and by waves of stable frequency to produce beat frequency resultant waves, a phase discriminator having two inputs, means including a regenerative frequency divider coupled between said mixer and said discriminator for applying waves representative of said beat frequency resultant waves as one input to said discriminator, means for applying waves of stable frequency as the other input to said discriminator, means for applying the voltage output of said discriminator to said frequency controlling means, and means responsive to a voltage change occurring in said divider in response to the decrease below a usable amplitude level of the resultant waves applied to said divider, for sweeping the frequency of said oscillator through a certain range.

11. In combination, an oscillator the frequency of which is to be controlled, voltage-responsive frequency controlling means coupled to said oscillator, at least one mixer excited by waves from said oscillator and by waves of stable frequency to produce beat frequency resultant waves, a phase discriminator having two inputs, means including a regenerative frequency divider coupled between said mixer and said discriminator for applying waves representative of said beat frequency resultant waves as one input to said discriminator, means for applying waves of stable frequency as the other input to said discriminator, means for applying the voltage output of said discriminator to said frequency controlling means, an auxiliary oscillator operatively arranged to sweep the frequency of said controlled-frequency oscillator through a certain range, and means coupling said auxiliary oscillator to said divider to render operative such oscillator in response to a voltage change occurring in said divider in response to the decrease below a usable amplitude level of the resultant waves applied to said divider.

12. In combination, an oscillator the frequency of which is to be controlled, voltage-responsive frequency controlling means coupled to said oscillator, at least one mixer excited by waves from said oscillator and by waves of stable frequency to produce beat frequency resultant waves, a phase discriminator having two inputs, means for applying waves representative of said beat frequency resultant waves as one input to said discriminator, means for applying waves of stable frequency as the other input to said discriminator, means for applying the voltage output of said discriminator to said frequency controlling means, a regenerative frequency divider coupled to said mixer, said divider operating to develop therein a wave of random frequency in response to the decrease below a usuable amplitude level of the resultant waves applied to said divider, and means coupling said divider to said phase discriminator to frequency modulate said oscillator by output resulting from said random frequency wave.

References Cited in the file of this patent

UNITED STATES PATENTS

| | | |
|---|---|---|
| 2,287,925 | White | June 30, 1942 |
| 2,434,293 | Stearns | Jan. 13, 1948 |
| 2,434,294 | Ginzton | Jan. 13, 1948 |
| 2,452,575 | Kenny | Nov. 2, 1948 |
| 2,541,454 | White et al. | Feb. 13, 1951 |
| 2,595,608 | Robinson et al. | May 6, 1952 |
| 2,698,904 | Hugenholtz | Jan. 4, 1955 |